PACKING FOLDER FOR ELECTRICAL COMPONENTS

Filed Sept. 14, 1966 2 Sheets-Sheet 1

3,352,415
PACKING FOLDER FOR ELECTRICAL COMPONENTS

William G. Seeley, Williamstown, Harold V. May, Pittsfield, and Jacob H. Martin, Williamstown, Mass., assignors to Sprague Electric Company, North Adams, Mass., a corporation of Massachusetts Filed Sept. 14, 1966, Ser. No. 579,301
11 Claims. (Cl. 206—78)

ABSTRACT OF THE DISCLOSURE

A book-type folder package of multi-ply sheets that accommodates a plurality of flanged blisters which are removably secured in apertures in the sheets by locating the flanges between plys of the sheets.

The present invention relates to packaging items for electrical components, and more particularly to a packing folder which accommodates a multitude of variable and interchangeable clear plastic blisters or other component containers suitable for shipping a variety of different components.

The use of Kovar and other brittle and easilly tarnished leads in transistors, microcircuits and other components has necessitated radical changes in packaging techniques for such items in recent years. Brittle materials which are easily broken under normal handling and shipping conditions, or otherwise call for special packaging techniques and packages, have made the cost of the shipping package and its reliability as a protective device primary considerations of the component purchaser.

Components using such lead materials have conventionally been packaged primarily in rigid polystyrene boxes holding a single unit which lies between a pair of resilient foam cushioning devices.

In addition to the bulk necessitated by such packing techniques, the packages does not always achieve its purpose of protecting the delicate leads since they are often bent during removal from the foam.

Furthermore, storage, counting of inventory, identification of units and other related problems on the consumers' part, and cost on the component manufacturer's part, compound the difficulties presented by the individual foam in plastic box or other lead protecting packages presently in use.

It is therefore an object of the present invention to provide an economical multiple component shipping package.

Another object of the present invention is to provide a protective package for electrical components having lead wires susceptible to permanent damage caused by handling or chemical contamination.

Still another object of the invention is to provide a folder package according to the above objects which accommodates a multitude of variable and interchangeable clear plastic blisters or other component containers suitable for shipping a variety of different components in a single compact unit.

A further object of the invention is to provide a folder package which protects the electrical components from dust and other contaminants while providing easy and positive identification of the component type, as well as in-package-testing of the component unit.

Other objects and advantages of the present invention will be made obvious to those skilled in the art by the following description when considered in relation to the accompanying drawing of which:

According to the present invention there is provided a shipping package for electrical components comprising a multiple-ply supporting sheet having a plurality of mounting compartments therein for component containers which have extended flange portions. The mounting compartments retain the extended flanges between two plys of the supporting sheet.

In the preferred embodiment the supporting sheets, of fiberboard or other semi-rigid material, are joined as two-leaved book-type folder and the mounting compartment are formed by apertures of different sizes in the upper sheets of the multiple-ply leaves.

Figure 1:
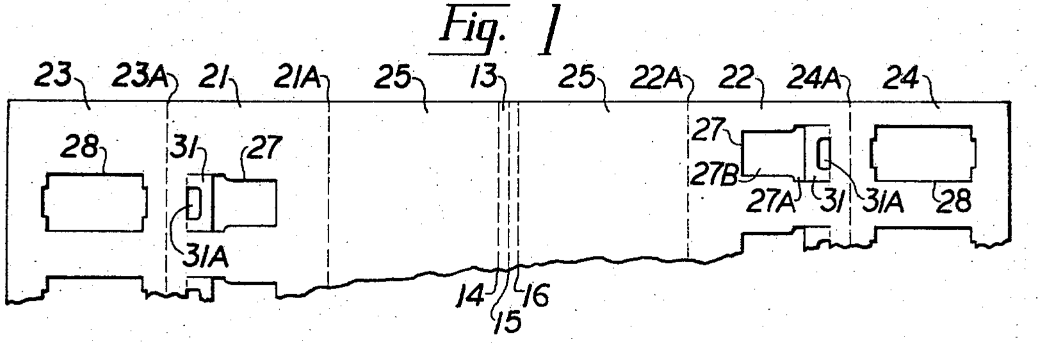
FIGURE 1 is a plan view of a portion of a punched fiberboard blank according to a preferred embodiment of this invention.

Referring to the drawing, FIGURE 1 shows a plan view of a portion of a fiberboard blank which has been die punched, scored and otherwise prepared for folding into the folder configuration of the invention. In this preferred embodiment, only a three-ply construction is shown, however, a two-ply or greater-than-three-ply structure may also be used. From this view the individual blank portions 23, 21, 25, 22 and 24 are seen. Sheets 23 and 24 when the blank is folded will form the central sheets which will underlie the front sheets 21 and 22 in the completed folder; the combination of front sheet and central sheet then being folded to overlie the back sheet portions 25 which, in addition to forming the base of the plied leaves of the structure, also forms the cover as well as the binding area 13 of the book-type folder.

Die punched into central sheet portions 23 and 24 are the central sheet apertures 28 described below. Punched into front sheets 21 and 22 are the front sheet apertures 27 which also provide, according to one embodiment of the invention, a single tab 31 having an aperture 31A both of whose functions are likewise described below. The slit score lines 23A, 21A, 22A and 24A permit the various blank portions to be folded to yield the folder configuration. The score lines 14, 15, and 16, occurring in the binding area 13 between the two sides of the blank give the ultimate folder its book-type folding capability.

Thus, each of the fiberboard plies is a portion of the single, larger, unitary fiberboard sheet which has been folded to form the multiple, in this case three, ply configuration. Although individual fiberboard layers may be used, the single folded structure is preferred because it provides the folder with added rigidity at the points of folding and simplifies construction by allowing conventional fiberboard blank cutting and folding techniques to be applied to the folder manufacture.

Figure 2:
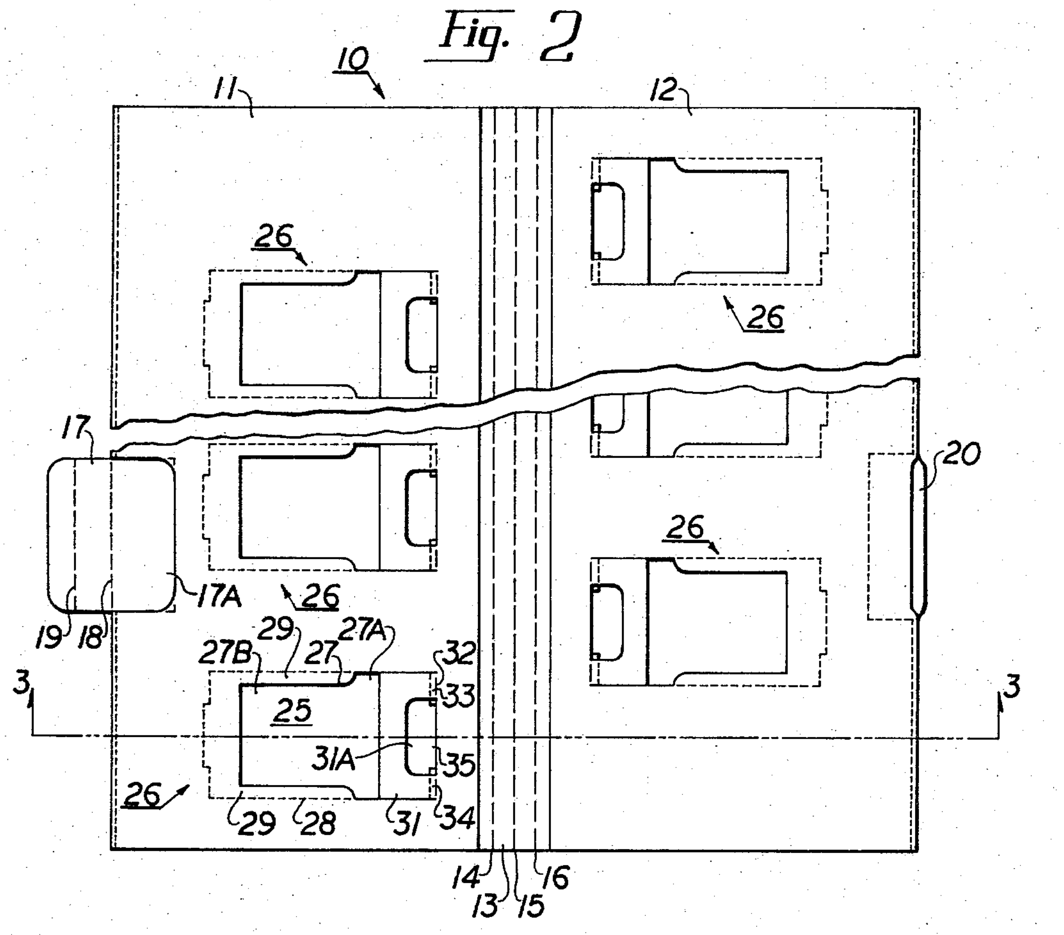
FIGURE 2 is a plan view of a folder of this invention.

FIGURE 2 shows a plan view of the inside face of the open folder 10 of the invention formed by properly folding the blank of FIGURE 1. In this view, the two leaves 11 and 12 of the folder are joined by the binding area 13 having slit score lines 14, 15 and 16 which allow the folder to close upward from the plane of the drawing. In the embodiment depicted, three binding area score lines are shown, however, any number of such lines may be used so long as the folder is permitted to fold in the proper manner; i.e., in a manner such that when components having thicknesses equal to or less than the distance between the score lines are packaged within the folder its two leaf members remain substantially parallel in the folded configuration.

A tab 17, extending from the edge of leaf 12 and having a plurality of score lines, in this embodiment two 18 and 19, inserts when the folder is closed or put into its folded configuration, into the slit or aperture 20 in the edge of the opposing leaf 11. Once again the number of score lines which occur on the tab is determined by the necessity for maintaining a uniform package shape which does not vary, within a reasonable range, with the thickness of the components packaged within the folder. The slit 20 is formed by the three-ply construction of the leaves shown in FIGURE 3.

Figure 3:
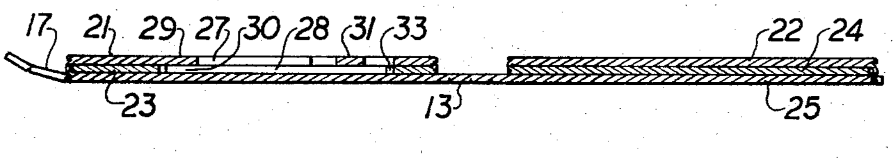
FIGURE 3 is a sectional view along the line 3—3 of FIGURE 2.

As shown in FIGURE 3, each of the leaves 11 and 12 consist of three fiberboard layers, front sheets 21 and 22, central sheets 23 and 24, and a back sheet 25 whose central portion 13 forms, as mentioned above, a binding area of the folder and whose extension forms the locking tab of the folder package.

The tab 17, in this single folded fiberboard construction, is then, in actuality, a segment 17A of front sheet 22 which has been cut on three sides so that when folded along fold line 18 into a position parallel to the plane of back sheet 25 is forms an extension of the back sheet.

By cutting a cavity at the proper location in sheet 23 and then folding, as shown, the aperture 20 is formed by portions of supporting sheets 21 and 25 which overlie the cavity in sheet 23. In the embodiment shown in FIGURE 2, a single locking tab 17 is utilized, however as the number of components stored within the package increases and the size of the package increases, the number of such locking tab may and should also increase.

It is of course clear that before the blank has been folded to form the folder configuration a suitable adhesive material must be applied to certain surfaces in order that the folded members be retained in their proper orientation after folding. This application of adhesive is made between the central sheet and the back sheet along those edges of the central sheet members which lie nearest the binding area and those edges of the central sheet members which lie furthest from the binding area. The application must be carefully performed so that the cured adhesive in no way interferes with the operation of any of the movable tabs or component containers of the folder.

The mounting compartments 26, hereinafter described in detail, form the mountings for the actual containers of the components. The compartments may be of any number and are most economically distributed evenly between the two leaves of the folder. Whatever their numerical arrangement on the individual leaves, the arrangement of the compartments 26 on opposing faces should be such that when the folder is closed or folded the opposing compartments lie in a staggered configuration with no compartment on one leaf overlying a compartment of the opposing leaf. In this manner, all usable space within the folder is utilized, the containers are held securely in place and the compactness of the folding structure is maintained.

The structure of the mounting compartments 26 is clearly shown when the compartment 26 of leaf 11 whose cross section is shown in FIGURE 3 is considered. As already described in FIGURE 1, the front sheet 21 has a cut-out portion or aperture 27 therein, which overlies a cut-out portion or aperture 28 in central sheet 23. Aperture 28 is slightly larger overall than aperture 27. The compartment is completed by back sheet 25 which in addition to acting as the cover for the folder package also forms the base of the mounting compartment. The aperture 27 has the shape of two rectangles which share a common non-existent edge. The first rectangle 27A has a width equal to that of the aperture 28 which it overlies and a length from ¼ to ⅓ of the entire aperture 27. The second rectangular portion 27B of the aperture 27 is narrower than aperture 28 which it overlies and also does not extend the full length of aperture 28. In this configuration there is provided a lip portion 29 of the front sheet 21 which extends over a part of cut-out 28 and provides a slit 30 between front sheet 21 and back sheet 25 suitable for accommodating the extended flange of the component container described below.

The cut-out 27, in this preferred embodiment, further provides a tab 31 which, as shown in FIGURE 1, is actually a portion of front sheet 21 designed so as to fold upward from the plane of the drawing at fold line 32. The tab 31 serves to hold in place the container which is to be introduced into the mounting compartment and to prevent any accidental extraction therefrom. The aperture 31A is provided to allow access to the leads of a packaged component which extend into the area under the tab 31 for purposes of testing. In this embodiment this is of course only possible when all of the component leads extend in the direction of the tab 31.

Figure 4:
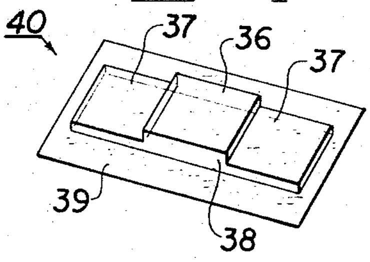
FIGURE 4 shows a blister according to a preferred embodiment of the invention.

A preferred embodiment of the component container which is inserted into the mounting compartment 26 is shown in FIGURE 4. The transparent thermoplastic blister of FIGURE 4 is made up of a first body portion 36 of proportions to receive the body of the component to be packaged therein, a second body portion 37 in two parts of proportions to receive and protect the lead portions of the packaged component, and an open base 38 having extended outwardly from its edge a planar flange 39 which lies substantially perpendicular to the side surfaces of the body portions and parallel to the surface upon which it lies.

Figure 5:
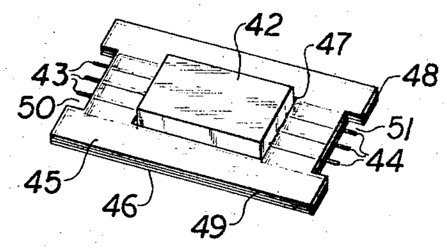
FIGURE 5 shows an alternate component container having a component therein according to a preferred embodiment of the invention.

FIGURE 5 shows an alternate preferred embodiment of a flanged component container of the invention. The component 42 having leads 43 and 44 which are sandwiched between two semi-rigid planar protective layers 45 and 46 is received within the edges of a cavity 47 lying substantially at the center of the superimposed protective layers. Along both sides of the component body, parallel to the lead members and likewise sandwiched between the two semi-rigid planar protective layers there are two spacers 48 and 49 having a thickness greater than that of the leads of the component and provided upon both of their planar surfaces with adhesive layers which serve to secure the protective layers to the spacers and hence together.

The lead members 43 and 44 extend beyond the edge of the protective layers at either end of the component container within bays 50 and 51 cut into the protective layers for that purpose. With this construction, a flange in the form of the extended portions of the protective layers is provided and the packaged component may be tested for electrical capability, without removal from the container, by application of test probes to the lead wires extending beyond bays. This container, like the plastic blister, is thus adaptable to any mounting compartment of the invention.

Figures 6, 7:
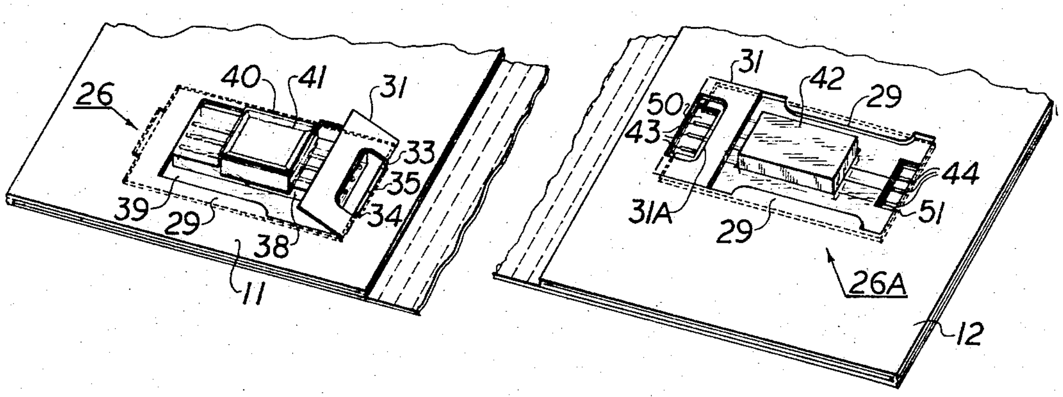
FIGURE 6 shows the blister of FIGURE 4 in its mounted configuration within the folder package and containing a package microcircuit component.
FIGURE 7 shows the component container and packaged component of FIGURE 5 in their mounted configuration within an alternative embodiment of the mounting compartment of the folder package.

FIGURE 6 shows the blister 40 of FIGURE 4 having an encapsulated microcircuit 41 packaged therein, mounted in a compartment 26 of folder leaf 11. The flange portion 39 of the blister 40 extends outwardly from the base 38 of the blister and into the slit 30 of FIGURE 3 lying below lip portion 29. The peripheral flange 39 of the blister 40, regardless of the size of the body portions of the blister, is designed to have uniform dimensions of length and width which are universal with all blisters of the invention designed to be accommodated in any single embodiment. This means that the dimensions of the flange in all component containers 40 should be such that the flange is received snuggly within at least two opposing peripheral edges of aperture 28. The blister 40, as described earlier, is provided in the preferred embodiment with an open base 38, however, in an alternate arrangement, the component may be substantially enclosed or sealed within the blister by an additional sheet (not shown) of thermoplastic material which is sealed to the flange portion 39. This embodiment is utilized to insure the cleanliness of the component or to retain small, loose fitting components in the blister.

As shown in FIGURE 6, tab 31 is folded down against the body portion of the blister 40 so as to secure it in position. When folded away from the component, tab 31 exposes two small extended portions 33 and 34 of central sheet 23 which provide an access cavity 35 between them, which cavity 35 allows a fingernail or suitable tool to be inserted below the flange of the component container contained within the compartment so that it may be removed by sliding the blister or other flanged component container from between the lip portion 29 and back sheet 25 over the tab 30 which has been folded away from the mounting compartment.

The embodiment of the invention depicted in FIGURE 7 provides the added advantage of enabling the component consumer to test the component before extraction from the folder package. The component container of FIGURE 5 is here shown mounted according to the conventional method in a slightly modified mounting compartment of the invention. The component 42 within its semi-rigid container is mounted within the modified compartment 26A by sliding the container flange under the front sheet lip 29. The tab 31 is folded down over the sandwiched leads with the tab aperture 31A overlying the protective layer bay 50 and the leads 43 which extend therefrom. At the opposite end of the mounting compartment 26A, a portion of the lip 29 of FIGURE 6 has been cut away, thus exposing the extreme end of the component container as well as its protective layer bay 51 and the leads 44 which extend therefrom. In this embodiment of the invention the consumer may test the packaged component by application of test probes to the exposed leads without removing them from the package.

Figure 8:
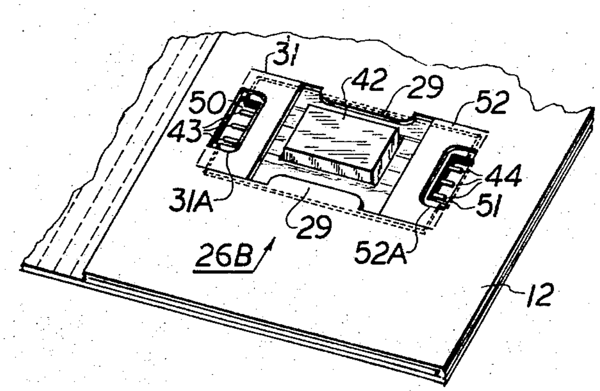
FIGURE 8 shows the component container and packaged component of FIGURE 5 in their mounted configuration within a further alternative embodiment of the mounting compartment of the folder package.

A like advantage is achieved when the embodiment depicted in FIGURE 8 is utilized. According to this embodiment, the component 42 in its protective container is conventionally inserted by sliding under front sheet lip 29 into modified mounting compartment 26B. This mounting compartment, in addition to tab 31 which allows access to the protective layer bay 50 and the leads 43 which extend therefrom through tab aperture 31A also has a second tab 52 identical to tab 31 at the opposite end of compartment 26B. This tab 52 has an aperture 52A identical to aperture 31A which allows access to protective layer bay 51 and the leads 44 which extend therefrom. This embodiment thus not only allows access to the leads for testing purposes, but also provides a second location for insertion or removal of the component container.

Various types of fiberboard may be used in the construction of this invention, however, those which are sulfur and chloride free are preferred, so that contamination and degeneration of component leads is minimized.

A further advantageous adaptation of the package may be made when the component to be shipped in the folder package has an overall length greater than the length of the mounting compartment. A blister or other flanged container capable of containing the component and an extended flange portion similar to that in the conventional structure of the invention but of greater length may be formed and inserted into a mounting compartment according to embodiment 26, 26A or 26B which has its tab 31 folded down into cut-out 27. The tab 31 is, in this case, flush with the front sheet 21 and the oversized container and component will overlie and extend beyond the tab. The component container must of course be short enough to fit within the boundaries of the folded leaf and cannot extend into the binding area of the folder.

The clear blister of the package provides a quick and easy means of identifying the package contents without removing them from the folder. The identifying numbers and names are easily read through the clear blister, which further provides a dust-free package.

Although the semi-rigid planar protective layer package does not provide the dust-free protection of the blister container, it does provide the same easy identification of packaged components and the advantageous in-package-testing capability.

A further alternate embodiment of the invention would provide packaging for any component whose structure is provided with a peripheral flange similar to that which extends from the open base of the blisters of protective layer containers of the preferred embodiments.

Should the component packaged within the compartment necessitate the use of a component container having an exceptionally thick flange portion, the number of central sheet members may be increased to provide the necessary thickness, and conversely, should the flange be of an exceptionally thin gauge, the central sheet may be done away with entirely and the flange inserted directly between the front sheet and back sheet which are not glued together about the periphery of the front sheet aperture.

By packing fixed and easily counted numbers, as 10, of components in each folder package, inventory count is simplified. Furthermore, the planar, uniform package shape makes storage economical while at the same time safe for the delicate lead wires.

Since it is obvious that many changes and modifications can be made in the above-described details without departing from the nature and spirit of the invention, it is to be understood that the invention is not to be limited to said details except as set forth in the appended claims.

What is claimed is:

1. A shipping package comprising at least two multi-ply supporting sheets of semi-rigid material joined along one edge as a leaved folder, each of said multiple-ply supporting sheets having mounting compartments therein, a plurality of component containers having extended flanges along at least two opposing sides thereof and designed to substantially enclose a variety of electrical components of non-uniform configuration, said multiple-ply supporting sheets each comprise a front sheet, at least one central sheet and a back sheet; said mounting compartments comprising a front sheet aperture designed to receive the body and lead members of said component within its peripheral edges, and at least one central sheet aperture, said central sheet aperture being at least wider than said front sheet aperture and underlying said front sheet aperture so as to provide a lip of said front sheet which extends over portions of at least two opposing edges of said central sheet aperture, said lip accommodating the extended flanges of the component containers between itself and said back sheet which forms a bottom portion of said mounting compartment; and said back sheet also providing a cover for said folder package and a pliable binding area, said area permitting said folder in its closed configuration to accommodate components having a thickness equal to or less than the maximum width of the binding area while substantially maintaining a spaced parallel relationship of said leaf members.

2. The shipping package of claim 1 wherein said mounting compartments on opposing leaves of said folder package lie in a staggered and non-overlying configuration when said folder is closed.

3. The shipping package of claim 1 wherein the said back sheet has a plurality of score lines in the binding area which provide the pliability thereof.

4. The shipping package of claim 1 wherein each of said multiple plies consists of a portion of a larger unitary sheet which has been folded to form the multiple-ply structure.

5. The shipping package of claim 1 wherein the component containers having extended flange portions comprise transparent thermoplastic blisters each having hollow body portions of proportions to accommodate the component to be packaged therein and provided with an open base having a peripheral flange extending outwardly therefrom.

6. The shipping package of claim 1 wherein openings are provided in said component containers adjacent the leads of said component, and access means are provided in said front sheet to expose said leads and permit contact thereto for electrical testing of said component without removal from said shipping package.

7. The shipping package of claim 1 wherein the component containers having extended flange portions comprise a pair of semi-rigid planar protective layers which sandwich the component leads and provide a cavity substantially at their center which receives the body of the component; said protective layers providing an extended laminated flange about said component and leads; and said layers include an opening adjacent said leads so as to expose said leads and permit contact thereto for electrical testing of said component without removal from said shipping package.

8. The shipping package of claim 1 having a tab portion of said front sheet extended within said front sheet aperture from one edge thereof; said tab having a width substantially equal to that of said central sheet aperture; and said tab having a fold line at its base so as to provide folding of said tab to allow insertion of said component and container, and to provide a stop to prevent movement of the component container in the package, and to permit access to one edge of the peripheral flange of said component container so that said component container and its packaged component may be removed from the mounted position.

9. The shipping package of claim 8 having an aperture in said tab providing access to a portion of one extremity of the flange of the component container and to component lead members therein without folding said tab from its securing position, said access aperture thus providing a location for the insertion of test probes for purposes of testing the electrical capability of said packaged component.

10. The shipping package of claim 9 having a portion of said front sheet lip cut away at the edge of the front sheet aperture opposite that to which said tab is attached, so as to expose a second extremity of the flange of the component container and leads therein, said cut-away lip portion providing access for the insertion of test probes for purposes of testing the electrical capability of said packaged component.

11. The shipping package of claim 9 having a second tab at an opposing edge of said front sheet aperture, said second tab being substantially identical to said first tab and providing a second location for the insertion of test probes for testing the electrical capability of the packaged component.

References Cited

UNITED STATES PATENTS

| | | | |
|---|---|---|---|
| 2,568,625 | 9/1951 | Harvey | 206—78 |
| 3,157,279 | 11/1964 | Samsing | 206—78 |

FOREIGN PATENTS

| | | |
|---|---|---|
| 363,290 | 8/1962 | Switzerland. |

LOUIS G. MANCENE, *Primary Examiner.*